United States Patent
Looker et al.

(10) Patent No.: US 6,353,982 B1
(45) Date of Patent: Mar. 12, 2002

(54) NET REPAIR BRIDGE

(75) Inventors: Robert Looker, Carpenteria; Richard McLennan, Rancho Palos Verdes, both of CA (US)

(73) Assignee: Satron, Inc., El Segundo, CA (US)

( * ) Notice: Subject to any disclaimer, the term of this patent is extended or adjusted under 35 U.S.C. 154(b) by 0 days.

(21) Appl. No.: 09/490,787

(22) Filed: Jan. 24, 2000

(51) Int. Cl.[7] .............................................. A44B 21/00
(52) U.S. Cl. ........................... 24/302; 24/298; 24/300; 24/301
(58) Field of Search ...................... 24/300, 302, 128, 24/298; 139/420 A; 53/1, 3

(56) References Cited

U.S. PATENT DOCUMENTS

| | | | | |
|---|---|---|---|---|
| 214,318 A | * | 4/1879 | Roloson | 24/128 |
| 1,490,066 A | * | 4/1924 | Carr | 224/577 |
| 3,602,409 A | * | 8/1971 | Kerns | 224/5 V |
| 4,079,909 A | * | 3/1978 | Einhorn | 248/318 |
| 4,738,006 A | * | 4/1988 | Juarez | 24/115 A |
| 5,072,470 A | * | 12/1991 | Lysiak | 5/496 |
| 5,361,726 A | * | 11/1994 | Harris et al. | 119/797 |
| 5,655,803 A | * | 8/1997 | Tacoronte | 291/1.1 |
| 5,675,841 A | * | 10/1997 | Jackson | 2/175.7 |
| 5,676,178 A | * | 10/1997 | Ehnimb | 139/384 R |

* cited by examiner

Primary Examiner—Anthony Knight
Assistant Examiner—Ruth L. Rodriguez
(74) Attorney, Agent, or Firm—Lyon & Lyon LLP

(57) ABSTRACT

A method and apparatus by which to repair a damaged portion of a net utilized to restrain movement. Attachment hooks or other hardware, constructed of a material, such as aluminum or steel, of a strength equal to or greater than the net material are secured to the ends of an appropriately sized rope or other material, constituting a bridging device. The attachment hooks or other hardware are constructed of a thickness, and with a radius interface, so that cutting of the net will not occur. The damaged area of the net is isolated, and the net repair bridge is affixed in the position of the damaged area, thereby replacing it and preserving the structural and functional capabilities of the containment net.

5 Claims, 1 Drawing Sheet

PLACEMENT OF
NET REPAIR BRIDGE

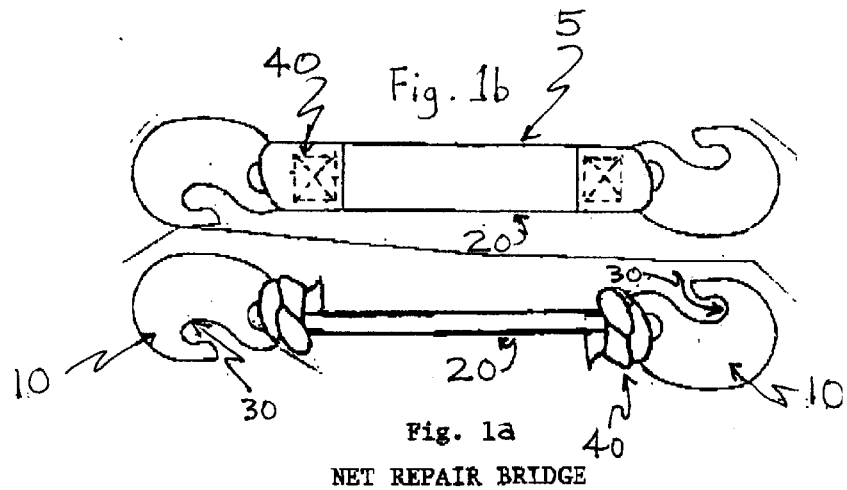
Fig. 1a
Fig. 1b
NET REPAIR BRIDGE
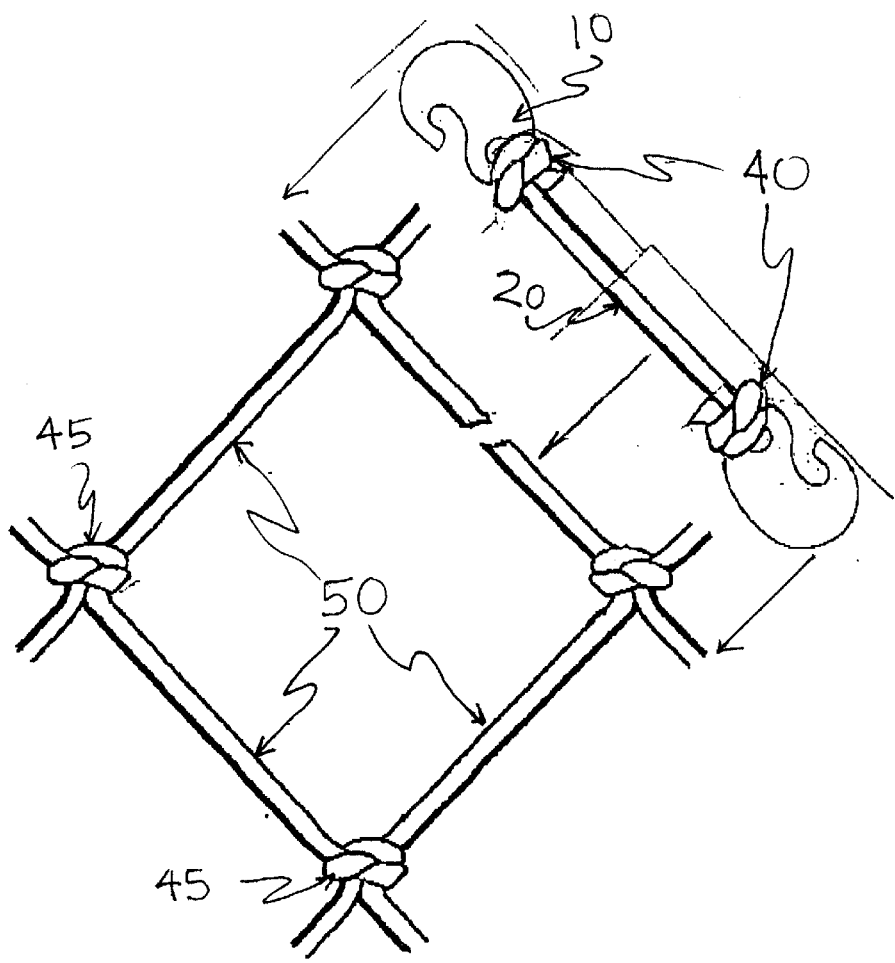
Fig. 2
PLACEMENT OF
NET REPAIR BRIDGE

NET REPAIR BRIDGE

BACKGROUND OF THE INVENTION

1. Field of the Invention

The field of the invention is methods and apparatus for repairing a damaged portion of a cargo net.

2. Prior Art

Cargo nets have long been used to hold and move cargo on ships, aircraft, and other vehicles. If a section of a cargo is broken or damaged, the integrity of the net and its ability to restrain is compromised. This can lead to potentially dangerous situations resulting from loose cargo. Of course, the entire net can be replaced, but this increases the cost of containment. The disposal of such nets also has environmental and safety-related consequences.

Therefore, there exists a need whereby a net can be repaired, thus avoiding the replacement of the entire net and its disposal, yet preserving the structural and functional capabilities of the net.

SUMMARY OF THE INVENTION

The present invention provides methods and apparatus for repairing or bridging damaged sections of cargo nets to allow their continued use following damage.

Attachment hooks or other hardware are secured to the ends of an appropriately sized material with functional characteristics similar to that of a portion of the net, thus forming a repair or bridging device. The hooks or other hardware are attached to the net structure above and below intersections adjacent to the damaged section. The net repair bridge thus preserves the structural and functional capabilities of the containment net.

BRIEF DESCRIPTION OF THE DRAWINGS

FIG. 1a is a view of a first embodiment of a net repair bridge utilizing material in the nature of rope, cable, or cord.

FIG. 1b is a view of a second embodiment of a net repair bridge utilizing material in the nature of a strap or wider material.

FIG. 2 shows the placement of the net repair bridge.

DETAILED DESCRIPTION OF THE PREFERRED EMBODIMENTS

Referring to FIG. 1a, a net repair bridge 5 includes attachment hooks or other hardware 10 attached to a strap section or bridge 20. The attachment hooks or other hardware 10 are constructed of a material of a strength equal to or greater than the strength of the net material so as not to reduce the load capacity of the net. Suitable materials for the hooks or other hardware are aluminum or steel. The attachment hooks or other hardware are constructed of a thickness, and with a radius interface, so that cutting of the net will not occur at the eye 30 of the attachment hooks or other hardware 10.

Referring to FIG. 1a and 1b, the strap section or bridge 20 is made of rope or other material of a strength equal to or greater than the net material, so that there is no reduction in the loaded capacity of the net. Suitable materials are nylon or polyester. The strap section or bridge 20 can be round or flat, as shown in FIG. 1a and 1b.

Referring to FIG. 2, the method for securing the attachment hooks or other hardware 10 to the rope or other bridging material 20, such as knots or sewing 40, is such that their strength is equal to or greater than the strength of the net material 50, so that there is no reduction in the load capacity of the net. Additionally, the method employed for securing the attachment hooks or other hardware 10 to the bridging material 20 ensures that there is a minimum of friction at the securing points 40 which might result in wear and tear at the securing points 40. The eyes 20 of the hooks or other hardware 10 are spaced apart to match the spacing between the tie points 45 of the damaged net 50.

What is claimed is:

1. A method for repairing a damaged net of the type having a multiplicity of tie points comprising the steps of:
    attaching a first hook of a net repair bridge onto the net, at a first tie point;
    attaching a second hook of a net repair bridge onto the net, at a second tie point, with the second tie point and the first tie point separated by a damaged section of the net, and with the first and second hooks attached to an inelastic flexible strap section; and
    holding the first tie point and the second tie point together with the net repair bridge.

2. A net repair bridge for a cargo net, said cargo net constructed of strands that are knotted at tie-points, the net repair bridge comprising:
    a) an inelastic strap section having a first end and a second end; said strap section having a tensile strength that equals or exceeds that of the strands of the cargo net;
    b) a first hook attached to said first end of said strap section, and a second hook attached to said second end of said strap section, said hooks sized and shaped to fit snuggly over the strands of the net so as to hold them securely, but without damaging the net;
    c) said hooks having a tensile strength that equals or exceeds that of the strands of the cargo net; and
    d) the overall length of the assemblage of said strap section and said hooks designed and constructed such that when said hooks are hooked onto adjacent tie-points on the cargo net, the distance between those adjacent tie-points is unchanged under load.

3. The net repair bridge of claim 2 in which said strap section comprises a flat woven material.

4. The net repair bridge of claim 2 in which said strap section comprises a braided rope-like material.

5. A repaired cargo net comprising:
    a) a cargo net constructed of strands that are knotted at tie-points;
    b) at least one said strand that is broken between adjacent tie points;
    c) a net repair bridge attached to and extending between said adjacent tie points, said net repair bridge comprising:
        i) an inelastic strap section having a first end and a second end; said strap section having a tensile strength that equals or exceeds that of the strands of the cargo net;
        ii) a first hook attached to said first end of said strap section, and a second hook attached to said second end of said strap section, said hooks sized and shaped to fit snuggly over the strands of the net so as to hold them securely, but without damaging the net;
        iii) said hooks having a tensile strength that equals or exceeds that of the strands of the cargo net; and
        iv) the overall length of the assemblage of said strap section and said hooks designed and constructed such that when said hooks are hooked onto said adjacent tie-points on the cargo net, the distance between those adjacent tie-points is unchanged under load.

* * * * *